Figure 1:
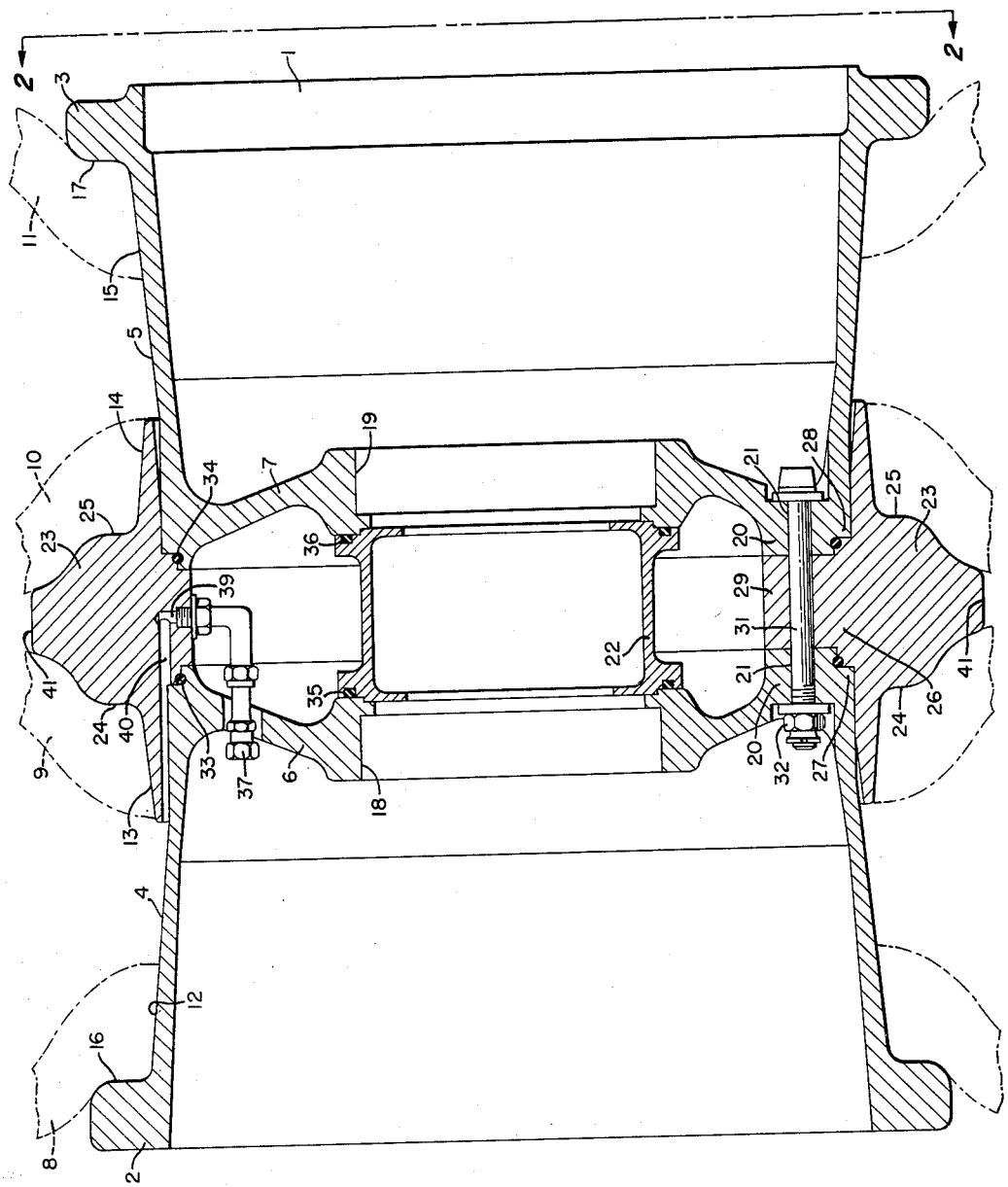

Nov. 3, 1964   D. H. METZLER   3,155,429
DUAL WHEEL

Filed Oct. 16, 1961   2 Sheets-Sheet 1

FIG. I

INVENTOR.
DONALD H. METZLER
BY
J.B. Holden
ATTORNEY

Nov. 3, 1964 D. H. METZLER 3,155,429
DUAL WHEEL

Filed Oct. 16, 1961 2 Sheets-Sheet 2

INVENTOR.
DONALD H. METZLER
BY
J. B. Holden
ATTORNEY

United States Patent Office 3,155,429
Patented Nov. 3, 1964

3,155,429
DUAL WHEEL
Donald H. Metzler, Akron, Ohio, assignor to The Goodyear Tire & Rubber Company, Akron, Ohio, a corporation of Ohio
Filed Oct. 16, 1961, Ser. No. 145,397
2 Claims. (Cl. 301—36)

This invention relates to a wheel construction and more specifically to a dual tire wheel for aircraft including an emergency wheel which becomes operative on failure of one or both tires.

In the past there have been numerous structures proposed as an emergency device in the event of tire failure while a vehicle is in motion. Two general classes of such devices were those directed to means incorporated as a part of the tire or tire and tube and those directed to auxiliary or crutch wheel structures. In either group, the failure of a tire caused the emergency device to become operative with the common objective of permitting as a minimum, the vehicle operator to retain control of the vehicle while bringing it to a stop.

In the case of aircraft, particularly those of the present time where the speeds and loads are of such great magnitudes, the known devices will not function as contemplated due to the inherent limitations. In the high speed jet aircraft, substantially all tires are mounted in dual and the failure of one tire during takeoff or landing will subject the other to such overloading that it will fail also. At the speeds involved, the tires are completely disintegrated in a very short time thus dropping the load onto the rim flanges. Since the wheel structure is usually aluminum, magnesium or of other light weight metal, the wheel will shatter or break up after a short length of roll on the runway. Under these conditions, due to the high wheel rotational speed the shattered parts are thrown into the aircraft structure and skin thus causing extensive damage or possible destruction of the aircraft as well as injuring or killing the personnel on board.

By providing an emergency tread that lies between the dual tires and extends beyond the rim flanges, the aircraft will be supported and travel on this tread in the event of tire failure. The tread must extend beyond the rim flanges a distance sufficient to prevent the rim flanges from engaging the ground even though the emergency tread is subjected to considerable abrasive wear during use and at the same time, it must not interfere with the tires during normal operation of the aircraft during takeoff and landing. The emergency tread to be satisfactory must provide support for the aircraft for a minimum of a take-off and landing since the tire failure may occur during a take-off run so that the emergency tread also must take the entire subsequent landing.

For aircraft use, it also is essential that the wheel structure require a minimum of space and be of minimum weight in order to be acceptable since space and weight are at a premium in aircraft. In the structure of this invention, the emergency device is in the form of an endless ring that not only includes the emergency tread but also the bead mounting means for one bead of each tire and the valve assembly for inflating each tire. In addition it serves as a spacer between the rim bases and is bolted together with the rim bases to form an integral, unitary dual wheel structure. It is therefore an object of this invention to provide an emergency wheel for aircraft that will enable the pilot to retain control of the aircraft in the event of tire failure.

Another object of the invention is to provide an emergency wheel structure that requires a minimum of additional space and added weight.

A second object of the invention is to provide a safety device in case of tire failure to prevent wheel fragmentation and resulting damage to the aircraft.

A further object of the invention is to provide an emergency wheel structure that does not interfere with the normal functioning of the tires and wheels.

A still further object of the invention is to provide an emergency wheel device that is an integral part of the wheel assembly.

Still another object of the invention is to provide an emergency tread for a dual wheel which will function as a minimum during the remainder of an aircraft take-off and subsequent landing in the event of tire failure during take-off.

Another object of the invention is to provide an emergency device for use on aircraft wheels that does not materially affect the normal tire and wheel assembly and disassembly procedures.

Other objects and advantages of this invention will become apparent hereinafter as the description thereof proceeds, the novel features, arrangements and combinations being clearly pointed out in the specification as well as the claims thereunto appended.

Figure 2:
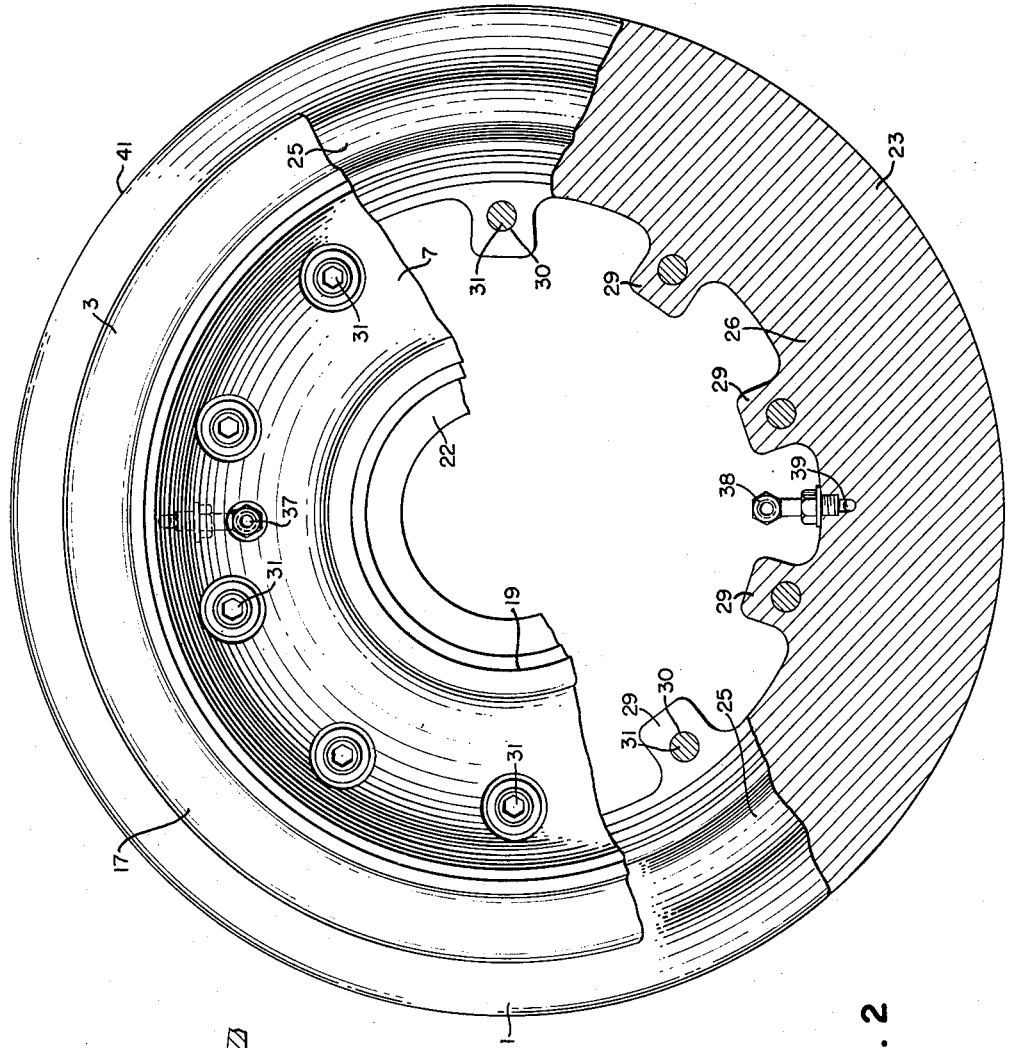
Figure 3:
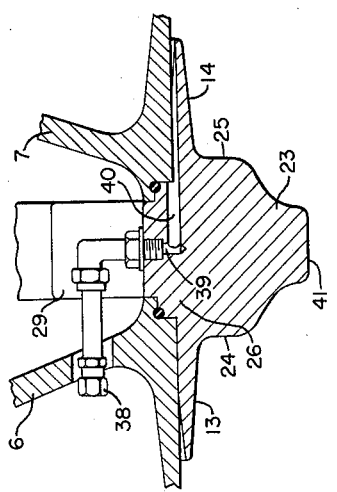

In the drawings:
FIG. 1 is a sectional view illustrating a wheel structure of the invention;
FIG. 2 is a section taken on line 2—2 of FIG. 1; and
FIG. 3 is a partial section of the invention.

As seen in FIGS. 1 and 2, a typical aircraft landing gear wheel 1 is comprised of a pair of wheel members 2 and 3 of forged or cast light-weight metal such as aluminum adapted to have a pair of tires (not shown) mounted thereon in the usual manner. Wheel members 2 and 3 each include rim base portions 4 and 5 and wheel discs 6 and 7. The tire beads 8, 9, 10 and 11 engage bead seats 12, 13, 14 and 15 respectively. Bead seats 12 and 15 are formed on rim bases 4 and 5 respectively and include along the outer peripheral edge, bead-retaining flanges 16 and 17. Extending radially inwardly from the inner edge of wheel members 2 and 3 are wheel discs 6 and 7 respectively as an integral part. As shown wheel bearing seats 18 and 19 are machined on the inner periphery of discs 6 and 7 to receive the wheel bearings (not shown).

Bosses 20 (FIG. 1) are integrally formed in the wheel discs 6 and 7 along the inner edge of rim bases 4 and 5 through which bolt-receiving apertures 21 pass. A spacer ring 22 lies between wheel members 2 and 3 at the inner portions of the wheel discs 6 and 7 to retain bearing lubricant and prevent entrance of foreign matter into the wheel bearings. Between wheel members 2 and 3 in the assembled wheel 1 is a one-piece unitary ring 23 which serves multiple purposes. The material from which ring 23 is formed preferably is of a non-shattering and relatively good abrasion resistant material and it has been found that a forged material such as aluminum is excellent for this use. Tire beads 9 and 10, one of each tire, are mounted on bead seats 13 and 14 formed on opposite sides of ring 23 and overlying a portion of rim bases 4 and 5. Portions 24 and 25 of a contour comparable to retaining flanges 16 and 17 serve as bead-retaining flanges for tire beads 9 and 10. Centrally on the inner periphery of ring 23 is a radially inwardly extending spacer ring portion 26 which engages notched portions 27 and 28 of rim bases 4 and 5 respectively to properly space the wheel members 2 and 3 in the rim base area of the assembled wheel 1. A series of bosses 29 corresponding in number and aligned with bosses 20 on wheel members 2 and 3, extend radially inwardly from the spacer ring portion 26 of ring 23 through which apertures 30 are formed. Bolts 31 are inserted in apertures 21 of wheel members 2 and 3 and apertures 30 of ring 23 with nuts 32 tightened thereon to hold the assembled parts together.

Since tubeless tires are currently used on most aircraft wheels, seals 33 and 34 of rubber are placed in the positions shown to prevent leakage of air from the cavity formed by the tires mounted on the wheel. Seals 35 and 36 between spacer ring 22 and wheel members 2 and 3 retain the bearing lubricant and prevent contamination of the wheel bearings. In order to inflate or deflate the tires, valves 37 and 38 are attached to the side of ring 23 at diametrically opposed positions (FIG. 2). A radial passageway 39 connects to an axially extending passageway 40 passing under bead seats 13 or 14 to communicate with the cavity formed by the mounted tire on the wheel. Valves 37 and 38 are each accessible from the same side of the wheel.

Extending radially outwardly from and as an integral part of ring 23 is the auxiliary or emergency tread 41 which is positioned between the mounted tires and does not interfere with the normal operation thereof. The diameter of emergency tread 41 is sufficiently greater than that of retaining flanges 16 and 17 so that the abrasive wear on tread 41 of a take-off and subsequent landing will not be sufficient to permit ground contact by flanges 16 and 17. Since tread 41 lies centrally of wheel 1, balance is maintained with only a relatively small drop in the rolling diameter of the wheel.

While certain representative embodiments and details have been shown for the purpose of illustrating the invention, it will be apparent to those skilled in the art that various changes and modifications may be made therein without departing from the spirit or scope of the invention.

Having thus described my invention, what I claim and desire to secure by Letters Patent of the United States is:

1. In a wheel for use on landing gear of high-speed aircraft wherein an integral dual wheel having inflatable tires mounted thereon includes a pair of light weight integral rim base members, each with an inwardly extending hub member along one edge thereof, an outwardly extending bead flange along the opposite edge thereof, the bead flanges lying on the outermost edges of the assembled wheel and a safety flange positioned between and assembled with said base members into a unitary wheel, the combination with such wheel of an improved safety flange formed of a one-piece, non-frangible aluminum wear resistant forging with a tire-mounting section on opposite sides thereof and overlying a portion of each of the rim bases, each said tire mounting section including a bead seat portion and bead retaining portion adapted to receive and retain the bead portion of a tire when mounted thereon and an outwardly extending ground-contacting emergency tread section between said tire-mounting sections, said emergency tread portion contoured to lie adjacent to and in contact with the lower sidewall portion of the mounted tires extending radially outwardly beyond the bead flanges on the opposite edges of the rim bases an amount sufficient to prevent said bead flanges of said rim base members from contacting the ground upon deflation of one or both tires, said emergency tread portion providing the aircraft supporting surface for the wheel structure during the operation of the aircraft after tire failure thus preventing possible aircraft damage by loss of control due to destruction of the wheel.

2. A non-frangible dual wheel on which tires are mounted for use on the landing gear of high-speed aircraft susceptible to extensive damage in the event of tire failure producing wheel disintegration, comprising a pair of aluminum allochiral rim bases, each base having mounting means integrally formed thereon adjacent one edge and a tire bead seat and retaining flange along the opposite edge thereof, a unitary circular flange member of high-strength, light-weight, non-frangible forged, abrasion-resistant metallic material positioned between said rim bases having a tire bead seat and retaining flange along each of the opposite edges thereof overlying a portion of the rim base, and an emergency tread surface lying adjacent to and in contact with the lower sidewall portion of the mounted tires and projecting outwardly beyond the retaining flanges on the opposite edges of said rim bases a distance sufficient to maintain the retaining flange of said rim bases out of contact with the ground providing an emergency rolling support for the aircraft in the event of tire failure, and fastening means to hold said rim bases and flange member in the assembled position to form an integral structure wherein the flange member is positioned between the tires mounted thereon and is normally inoperative but becoming operative in the event of tire failure with the emergency tread providing support for the aircraft so that the pilot can retain control thereof.

References Cited in the file of this patent

UNITED STATES PATENTS

| | | |
|---|---|---|
| 741,193 | Turkington | Oct. 13, 1903 |
| 2,990,216 | Albright et al. | June 27, 1961 |

FOREIGN PATENTS

| | | |
|---|---|---|
| 92,510 | Austria | May 11, 1923 |
| 1,155,794 | France | Dec. 2, 1957 |